J. L. MEADOWS.
GAGE FOR SEED PLANTERS AND CLOD REMOVER IN COMBINATION THEREWITH.
APPLICATION FILED MAY 14, 1917.
1,246,451. Patented Nov. 13, 1917.
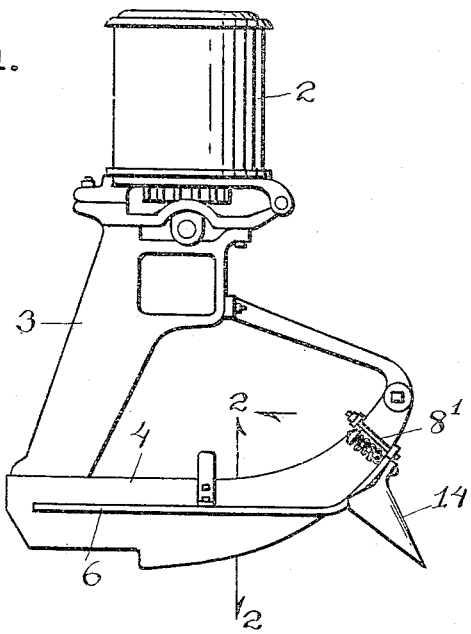
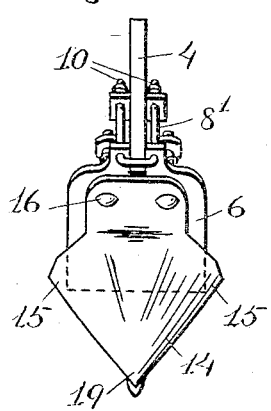
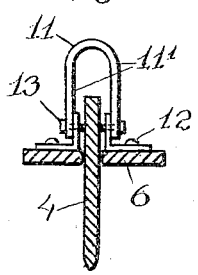
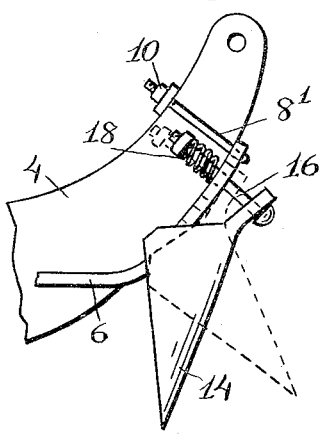
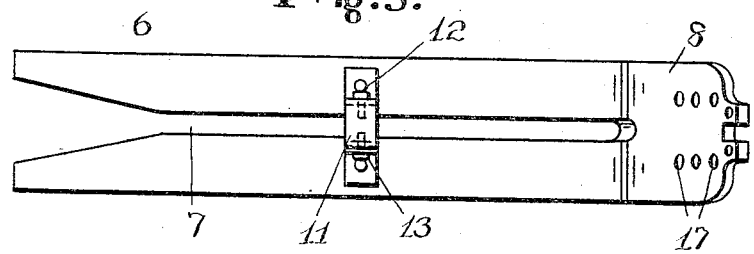
Inventor
J. L. Meadows.
E. W. Anderson & Son
By his, Attorneys

UNITED STATES PATENT OFFICE.

JOHN L. MEADOWS, OF NOBLE, ILLINOIS.

GAGE FOR SEED-PLANTERS AND CLOD-REMOVER IN COMBINATION THEREWITH.

1,246,451.  Specification of Letters Patent.  Patented Nov. 13, 1917.

Application filed May 14, 1917. Serial No. 168,394.

*To all whom it may concern:*

Be it known that I, JOHN L. MEADOWS, a citizen of the United States, resident of Noble, in the county of Richland and State of Illinois, have made a certain new and useful Invention in Gage for Seed-Planters and Clod-Remover in Combination Therewith; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied.

Fig. 2 is a section on the line 2—2 Fig. 1.

Fig. 3 is a front view of the invention, as applied.

Fig. 4 is a fragmentary side view of the invention as applied, showing the shovel as moved rearwardly, the normal position of the shovel being shown in dotted lines.

Fig. 5 is a detail plan view of the gage.

The invention has relation to a gage for seed planters having an adjustable furrow opener or clod remover, in combination therewith, and it consists in the novel construction and combinations of parts, as hereinafter set forth.

In the accompanying drawings illustrating the invention, the numeral 2 designates the seed box of the planter, 3, the chute, and 4 the runner or shoe.

6, is a horizontal gage, preferably made in one piece, and bifurcated or split longitudinally by a slot 7, said gage having an upwardly and forwardly extending front end portion 8, fitting closely against the front portion of said runner.

The gage is supported from the runner in front by a staple or clip 8, extending over the top of the runner blade and provided with securing nuts 10 upon the branches thereof; and in rear or substantially midway of its length by a clevis or loop 11, extending over the top of the runner blade, the branches 11' of the loop being bolted to the gage at 12, inwardly extending horizontal set screws 13, fitting in horizontal threaded perforations of said branches and having engagement with the vertical sides of the runner blade. In this way, the gage may be adjusted horizontally up and down or for depth by adjustment of the set screws and of the forward staple or loop.

The furrow opener and clod remover consists of a downwardly and forwardly extending ridged shovel or nose 14, the laterally and rearwardly extending or inclined wings 15 of which project beyond the lateral edges of the gage, fitting in rear closely against the outwardly and forwardly extending front portion of the gage and being supported therefrom by bolts 16, designed for engagement with any one of a vertical series of perforations 17 of the gage, whereby the furrow opener and clod remover may be adjusted for depth.

Springs 18 surround the rear portions of the bolts, and are located between the rear nuts thereof and the gage, so that the shovel will be allowed a limited rearward movement under strain, being returned to normal position by said springs.

The furrow opener and clod remover shovel being pointed at its lower end at 19, is enabled to readily enter the soil.

The downwardly and forwardly extending ridge of the shovel will, in connection with the inclined wings thereof, throw the clods of dirt away from the runner blade at both sides thereof.

In using the device in sodded ground, the furrow opener and clod remover shovel is not needed, and will be detached from the gage.

I claim:—

The combination with a runner blade of a seed planter, having an upwardly and forwardly extending front portion, of a horizontal gage having branches spaced apart by a longitudinal slot, said gage having an upwardly and forwardly extending front portion in contact with said front portion of the runner blade, a clip connecting the front portions of said blade and of said gage and slidable upwardly and downwardly upon said front portion of the blade in the adjustment of the gage, said branches of the gage having a U-form upwardly extending connection straddling said blade, and set screws carried by said connection and having adjustable engagement with the sides of said blade, said front portion of the gage having a series of perforations, a furrow opener and clod remover provided with attachment bolts adjustably engaging said perforations, and coiled springs surrounding said bolts and adapted to return the furrow opener to normal position after movement thereof under strain.

In testimony whereof I affix my signature, in presence of two witnesses.

JOHN L. MEADOWS.

Witnesses:
 FRANK SONNER,
 W. W. PRICE.

Copies of this patent may be obtained for five cents each, by addressing the "Commissioner of Patents, Washington, D. C."